United States Patent [19]

Carlsson et al.

[11] 4,354,231

[45] Oct. 12, 1982

[54] APPARATUS FOR REDUCING THE INSTRUCTION EXECUTION TIME IN A COMPUTER EMPLOYING INDIRECT ADDRESSING OF A DATA MEMORY

[75] Inventors: Karl-Johan V. Carlsson, Solna; Hans O. S. Kjøller, Västerhaninge, both of Sweden

[73] Assignee: Telefonaktiebolaget L M Ericsson, Stockholm, Sweden

[21] Appl. No.: 183,260

[22] Filed: Sep. 2, 1980

Related U.S. Application Data

[63] Continuation-in-part of Ser. No. 97,178, Nov. 26, 1979, abandoned, which is a continuation of Ser. No. 877,255, Feb. 13, 1978, abandoned.

[51] Int. Cl.$^{3}$ .................................................. G06F 9/30

[52] U.S. Cl. ...................................................... 364/200

[58] Field of Search ... 364/200 MS File, 900 MS File

[56] References Cited

U.S. PATENT DOCUMENTS

| | | | |
|---|---|---|---|
| 3,490,005 | 1/1970 | Anderson et al. . | |
| 3,644,900 | 2/1972 | Mizoguchi . | |
| 3,766,527 | 10/1973 | Briley | 364/200 |
| 3,916,385 | 10/1975 | Parmar et al. | 364/200 |
| 3,949,379 | 4/1976 | Ball | 364/200 |
| 4,042,911 | 8/1977 | Bourke et al. | 364/200 |

OTHER PUBLICATIONS

Computer, vol. 7, No. 11, Nov. 1974, pp. 24–38.

IBM Technical Disclosure Bulletin, vol. 10, No. 2, Jul. 1967.

*Primary Examiner*—Gareth D. Shaw
*Assistant Examiner*—Eddie P. Chan
*Attorney, Agent, or Firm*—Hane, Roberts, Spiecens & Cohen

[57] ABSTRACT

Instructions which are read from a program memory of a control computer employing indirect addressing of a data memory are stored temporarily and sequentially in a buffer memory to form an execution queue. The absolute address to the data memory is generated by an address calculator by means of a base address derived from a reference memory in correspondence to an input address and by means of at least one address parameter which has been recorded in a register memory in connection with the execution of an instruction read from the buffer memory and transferred to a parameter register prior to the address calculation. In addition to each instruction, information is recorded in the buffer memory to indicate on the one hand whether the instruction is of the type which performs a write or read operation in the data memory and on the other hand whether it is of the type which enters address parameters in the register memory. This additional information is continually monitored and, when it shows that the address parameters will not be changed by any instruction in the queue ahead of a write or read instruction which has just entered the queue, the required address calculation process is initiated.

5 Claims, 3 Drawing Figures

APPARATUS FOR REDUCING THE INSTRUCTION EXECUTION TIME IN A COMPUTER EMPLOYING INDIRECT ADDRESSING OF A DATA MEMORY

CROSS-REFERENCE TO RELATED APPLICATIONS

This application is a continuation-in-part of application Ser. No. 97,178, filed Nov. 26, 1979, now abandoned which is a continuation application of Ser. No. 877,255, filed Feb. 13, 1978, now abandoned.

BACKGROUND OF THE INVENTION

The present invention relates to apparatus for reducing the instruction execution time in a computer employing indirect addressing of a data memory included in the computer, where the absolute address to the data memory is derived in an address calculating unit by means of a base address read from a reference memory in correspondence to an input address and at least one address parameter which has been placed, previously, in a register memory in connection with the execution of an instruction read from the program memory and transferred to a parameter register prior to the address calculation.

Swedish patent specification No. 365,093 describes a computer system in which the various functions are divided into so called function blocks, each of which performing its function in accordance with an individual control program. An instruction sequence corresponding to a certain function may involve a jump to a certain start point in a control program belonging to another function block in order to initiate in that block, e.g. the reading of the contents of a data register with a jump then being made to a third function block in order to have a write-out of the read data onto a readable medium. This communication between the data blocks requires that the respective control program can address the desired start points in the other programs. Thus, according to the conventional technique, each control program is written for the surroundings in which it is to work. To attain maximum flexibility as to changes of the system configurations, introduction of new function blocks, modification of existing blocks, etc. the above mentioned patent specification proposes a special addressing technique which enables changes to be made without affecting indirectly-involved individual control programs with respect to jump addresses. In connection with the execution of a program instruction involving writing or reading in a data memory or a data memory area belonging to a certain function block a considerable amount of time is required for the address calculation since it always involves the reading of a base address from a reference memory in correspondence to an input address, defined by the program instruction, which is then combined with one or more address parameters which have been transferred from a register memory to a parameter register in connection with an address calculating unit. The address parameters are variables which have been placed in the register memory in connection with the execution of an earlier instruction from the program memory. Their purpose is to specify a specific part of the memory area being selected by a base address received from the reference memory. In a system where several such write and read operations are to be performed a large increase in the efficiency can be attained if the waiting times caused by the address calculation routine can be reduced.

SUMMARY OF THE INVENTION

The invention contemplates that an address calculation is started in good time before the program instruction in question is to be executed so that the waiting times are eliminated in most cases.

BRIEF DESCRIPTION OF THE DRAWING

The objects, features and advantages of the invention will be apparent from the following detailed description when read with the accompanying drawing where.

DESCRIPTION OF THE PREFERRED EMBODIMENTS

Figure 1:
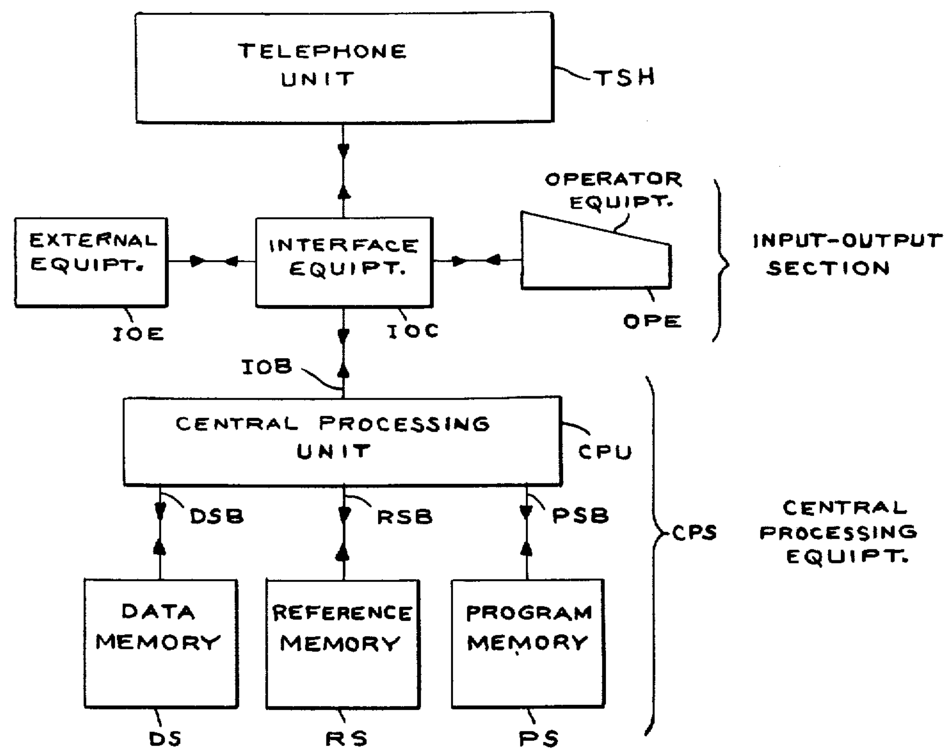
FIG. 1 is a block diagram of a computer controlled system utilizing the invention.
Figure 2:
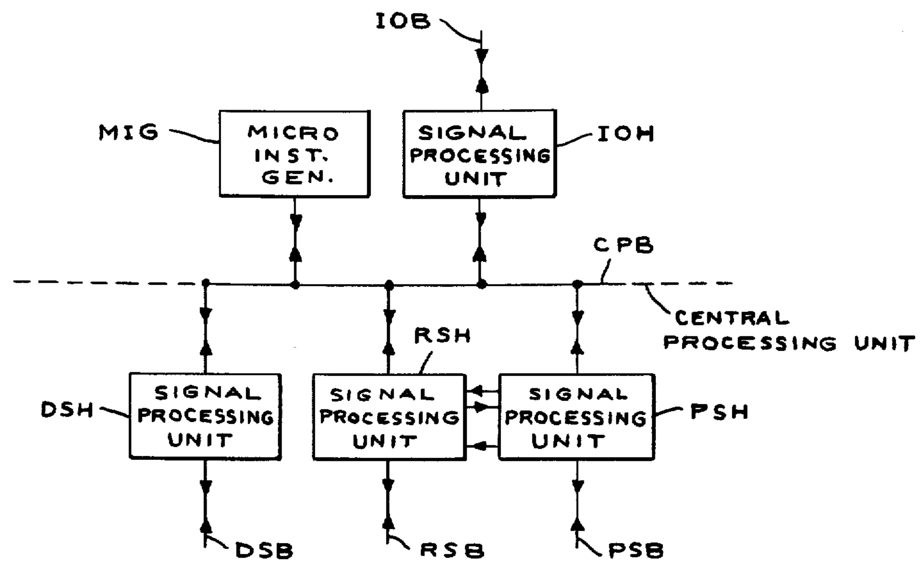
FIG. 2 is a block diagram showing a number of the function units included in the central processing unit of the system of FIG. 1.

The block diagram of FIG. 1 illustrates a telecommunication system consisting of: a telephone unit TSH including, mainly, electromechanical components; an input-output section including an interface equipment IOC to which are connected an operator equipment OPE and other external equipments IOE; and a central processing system CPS including a central processing unit CPU, a data memory DS, a reference memory RS and a program memory PS. A system of this type is described in ERICSSON REVIEW No. 2, 1976. The block diagram of FIG. 2 shows some of the function units which are connected to the central processor bus CPB in the central processing unit CPU. Elements DSH, RSH and PSH are signal processing units which interconnect a corresponding memory unit DS, RS and PS, respectively, with the processor bus CPB. Element IOH is the signal processing unit of the I/O part and element MIG is a micro-instruction generator by means of which the communication between the various units is administered. Specific for the invention are the additional direct connections between the two units RSH and PSH for certain autonomous functions.

The micro-instruction generator MIG includes a PROM-memory which holds microprogram sequences corresponding to all those instructions which are emitted by the signal processing unit PSH from program memory PS. The program sequences comprise various numbers of micro instructions, each one including addresses and orders to a sending and a receiving function unit. Each sequence includes a micro instruction which orders transfer of the next instruction from the unit PSH to the unit MIG in good time before the sequence is ended. Certain of the instructions which are read from the program memory PS by means of the unit PSH comprise one or more address parameters. An address parameter can be of the type which explicitly selects a certain memory cell or a certain register in one of the function units. In the case of an instruction which concerns writing or reading in the data memory DS, however, it is normally necessary to calculate an absolute address by means of a base address which is read from the reference memory RS and one or more address parameters which are read from a register memory included in the signal processing unit DSH. These address parameters are placed in the register memory in connection with the execution of various instruction sequences, e.g. when reading from the data memory. These address parameters remain in the register memory for various intervals of time until they are being modified by execution of a later instruction sequence. Meanwhile, the parameters are used for the calculation of absolute addresses according to the above. The invention enables an address calculation for such an instruction to be made before the instruction reaches the head of an instruction queue. Hence a higher execution rate is attained.

Figure 3:
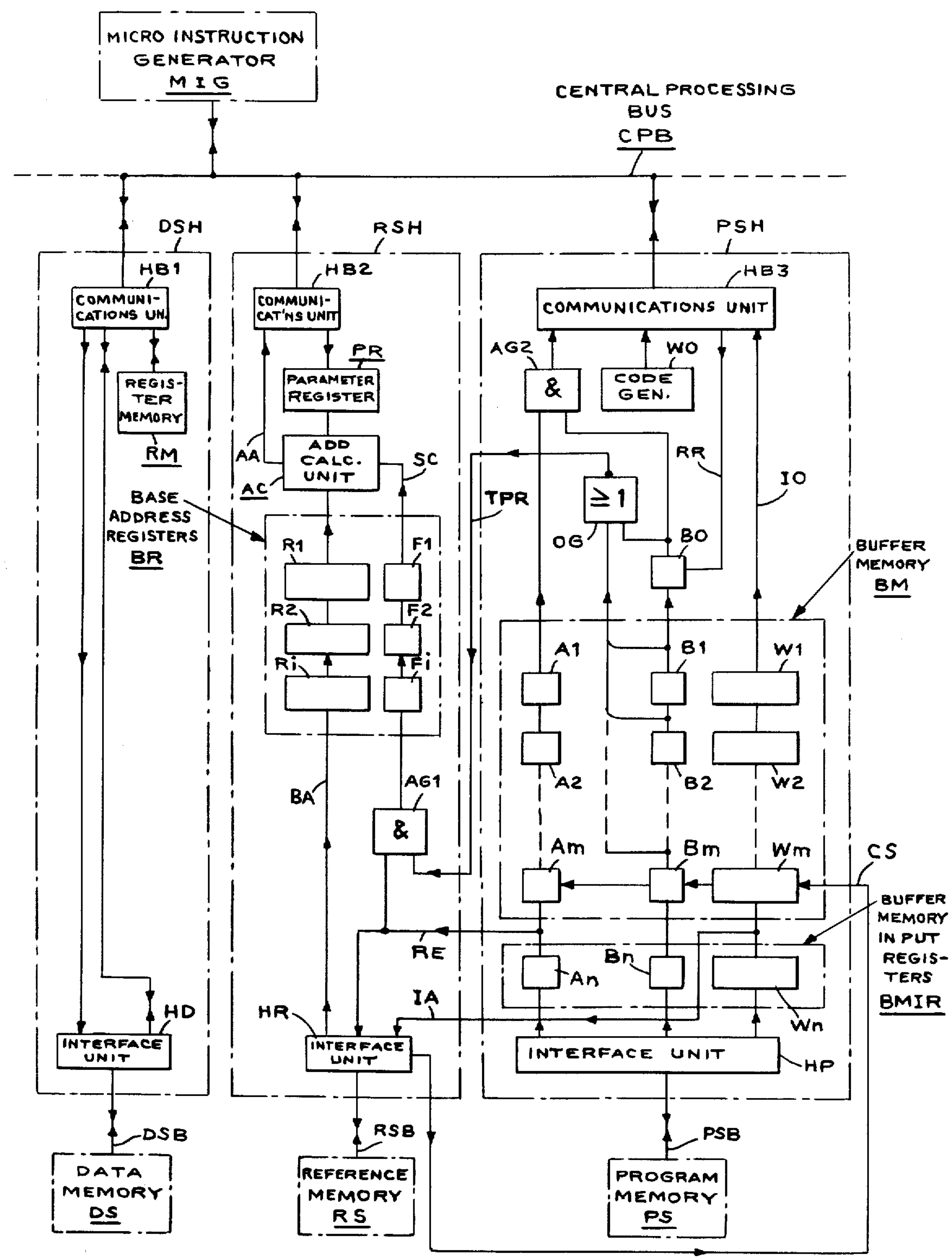
FIG. 3 is a logic diagram incorporating the function elements which are necessary for the description of the invention.

The principle of the invention appears from the embodiment shown in FIG. 3 in which those function elements of the signal processing units DSH, RSH and PSH which are essential for the description have been incorporated. Each of the three units is connected to the central processor bus CPB via a respective one of the communication units HB1, HB2, HB3 by means of which the signal processing units can be called by the micro-instruction generator MIG, selectively. The signal exchange with the respective memory units DS, RS, PS is made by means of the interface units HD, HR, HP. Furthermore the units PSH and RSH are directly interconnected by means of the cables CS, TPR, RE and IA. As mentioned previously, the signal processing unit DSH includes a register memory RM which stores the parameters that are to be used for the calculation of absolute addresses to the data memory DS. The signal processing unit RSH includes: a parameter register PR which receives the parameters from the register memory RM prior to the address calculation; a base address register BR comprising a number of register stages R1–Ri, F1–Fi for storing base addresses which are received on a cable BA via interface unit HR and cable RSB from the reference memory RS together with a flag bit which is received from an AND-gate AG1; and an address calculating unit AC in which the absolute address to the data memory is calculated according to an algorithm such as addition. The base address is read from the reference memory RS in accordance with an input address received on cable IA and the read-out is initiated by means of an activating signal received on cable RE. The signal processing unit PSH includes a buffer memory BM comprising a number of memory words W1–Wm for the sequential, temporary storage of instructions which are read from the program meory PS, and additional memory devices A1–Am, B1–Bm for storing information in connection with the instructions in a way hereafter described. The memory BM, as also the base address register BR in the unit RSH, is of the type first-in/first-out which means that the data which are fed to the buffer memory input are supplied at the memory output in the same order as the one in which they were fed to the memory. In addition, the memory BM is of the FIFO type which can be treated as a stack of registers wherein words are fed into the bottom of the stack and removed from the top. Furthermore, any word entered into the bottom of the stack is fed to the highest empty register. Such a memory can be of the type shown in U.S. Pat. No. 3,972,034 issued July 27, 1976. The unit PSH further includes: the buffer memory input registers BMIR; a register BO; an AND-gate AG2; an OR-gate OG; and a code generator WO. The purpose of the latter is to supply the instruction which initiates the transfer of parameters from the register memory RM to the parameter register PR.

The reading of program instruction from the program memory PS is controlled, autonomously, from the interface unit HP, which means that new instructions are transferred to the register Wn as soon as the previous instruction enters the buffer memory BM. Simultaneously with the transfer, the instruction is analysed in the unit HP with regard to two characteristics: (a) is the instruction of the type which performs writing or reading in the data memory?; (b) is the instruction of the type which places address parameters in the register memory RM? If the answer to question a is yes a "one" is recorded in the memory device An, if the answer to question b is yes a "one" is recorded in the memory device Bn. As the topmost memory positions, i.e., register W1 and memory devices A1 and B1 become free, the queuing instructions, together with their auxiliary information, move up one level in the buffer memory BM. At the same time as an instruction is fetched via cable IO for the execution by the micro-instruction generator MIG, a "one", if present in the memory device B1, is transferred to the registger BO to signify that the instruction executed last was of the type which places address parameters in the register memory RM.

The information in the memory device An is sensed and fed on cable RE to the unit RSH to indicate that a read-out from the reference memory RS is required. If the register stage Ri in the base address register BR is free the base address corresponding to the input address received via cable IA from the register Wn of the input registers BMIR is then transferred via cable BA to the base address register BR. Furthermore, if a "one" is received on cable TPR the AND-gate AG1 is activated and a flag bit is recorded in register stage Fi. This recording in stage Fi is the indication for the recordings in positions Ri and Fi to be stepped to the next stage in the base address registers BR. When the recordings have reached the positions R1 and F1 the flag bit activates the address calculator AC via the input SC and an address calculation is made (such as an addition) based on the contents of the parameter register PR and register stage R1 of the base address register BR. The calculated address is supplied on the output AA and is utilized by the unit MIG in executing the corresponding instruction when it has reached position W1 of the buffer memory BM.

The above mentioned condition on circuit TPR is received from the OR-gate OG of the unit PSH only if none of the memory devices B1–Bm, nor the registger BO contains a "one", which means that no parameter transfer is required in order to perform an address calculation for the instruction which is registered in the buffer memory input register Wn. If, according to the embodiment, a "zero" is present on circuit TPR then there is no further readout from the reference memory RS to the register BR because there is a "one" stored in one of cells B0 to Bm signifying that a change of the contents of the register memory RM is likely to take place. Consequently, the read-outs from the program memory PS must be inhibited, temporarily. In practice, this can be attained in such a way that a transfer of the contents of the input register Wn to the inputs of the buffer memory BM and thence to the topmost available register therein and from the memory devices An, Bn to the memory devices related with such register, respectively, is not made unless a check signal is received via line CS from the unit RSH to indicate that the read-out ordered on cable RE can be made. In effect the signal on CS controls the gating of the information from the buffer memory input registers BMIR to the buffer memory BM.

The parameter transfer is initiated only if any change of the address parameters from the register memory RM can have taken place since the previous transfer of parameters to the parameter register PR and, according to the embodiment, this transfer is made only if the instruction in turn for execution is of the type which performs writing or reading in the data memory DS. According to this pre-requisite, a "one" is present in both the register BO and the memory device A1 and hence the AND-gate AG2 will supply an activation signal to the communication unit HB3. As a consequence of this, a quasi interrupt is made when the micro-instruction generator MIG is to fetch the next instruction from the unit PSH, in order that a read-out will be made from the code generator WO instead of being made from the memory word W1. The instruction read from the generator Wo points to that instruction sequence in the unit MIG which causes the current address parameters being required for the calculation of the absolute address to be transferred from the register memory RM via the central processor bus CPB to the parameter register PR. The microprogram sequence also effects zero setting of the register BO via the circuit RR which, according to the preceding, is one of the conditions for obtaining a "one" in circuit TPR.

While only one embodiment of the invention has been shown and described in detail, there will now be obvious to those skilled in the art many modifications and variations satisfying many or all of the objects of the invention without departing from the spirit thereof as defined by the appended claims.

What is claimed is:

1. In a computer under control of instructions from a program memory and employing indirect addressing of a data memory included in the computer, where an absolute address to the data memory is derived in an address processing means from a base address which is read from a reference memory in correspondence to an input address to the reference memory and from at least one address parameter which has been stored in a register memory in connection with the execution of an instruction read from the program memory, appartaus for reducing the instruction execution time comprising a buffer memory means for sequentially and temporarily storing in an execution queue instructions read from said program memory, a read-out means for reading base addresses from said reference memory in correspondence to said input address and a read signal, the input address as well as the read signal being derived from an instruction just supplied to said execution queue if the instruction is of a first type which concerns writing or reading in said data memory, a registration means for giving an indication that an instruction which is of a second type that places address parameters in the register memory has been supplied from the output of said buffer memory, a first activation means for initiating transfer of said at least one address parameter from said register memory to said address processing means if said indication is present in said registration means and the instruction being in turn for feed-out to the output of said buffer memory means is of said first type and for removing said indication in the registration means when said transfer has been executed, and a second activation means connected to said address processing means and responsive to a base address which is being read out from said reference memory to said address processing means for initiating the calculation of said absolute address when simultaneously none of the instructions stored ahead of said instruction just supplied to said buffer memory means is of said second type and no indication is present in said registration means.

2. Apparatus in accordance with claim 1, wherein said buffer memory means comprises a plurality of first-in first-out memory registers for the sequential and temporary storage of instructions, and first and second memory devices associated with each of said memory registers for storing information indicating that the stored instruction is of the first or the second type, respectively.

3. Apparatus in accordance with claim 1, wherein said address processing means comprises an address calculating means and a base address register including at least one register stage for sequential and temporary storage of base addresses that are read from said reference memory.

4. Apparatus in accordance with claim 3, wherein said address processing means further comprises a parameter register for storing said at least one address parameter.

5. Apparatus in accordance with claim 4, wherein said base address register further comprises a plurality of flag bit positions corresponding to said number of register stages for storing an indication signal from said second activation means together with the just read base address and an output for said stored indication signal being provided from said base address register for activating said address calculating means to calculate an address derived from one of said base addresses and the address parameter stored in said parameter register.

* * * * *

UNITED STATES PATENT AND TRADEMARK OFFICE

CERTIFICATE OF CORRECTION

PATENT NO. : 4,354,231

DATED : October 12, 1982

INVENTOR(S) : Karl-Johan V. Carlsson, Solna; Hans O. S. Kjoller, Västerhanginge, both of Sweden It is certified that error appears in the above-identified patent and that said Letters Patent are hereby corrected as shown below:

-- Foreign Application Priority Data

February 28, 1977(SE) Sweden.......7702207

Signed and Sealed this

*Twenty-second* Day of *February 1983*

[SEAL]

*Attest:*

GERALD J. MOSSINGHOFF

*Attesting Officer* *Commissioner of Patents and Trademarks*